United States Patent [19]

Schissel

[11] Patent Number: 4,831,105

[45] Date of Patent: May 16, 1989

[54] ANISOTROPIC MELT-FORMING COPOLYCARBONATE FROM 4,4'-DIHYDROXY BIPHENYL AND METHYL HYDROQUINONE

[75] Inventor: David N. Schissel, Clifton Park, N.Y.

[73] Assignee: General Electric Company, Schenectady, N.Y.

[21] Appl. No.: 212,632

[22] Filed: Jun. 28, 1988

[51] Int. Cl.$^4$ ............................................. C08G 63/62
[52] U.S. Cl. ..................................... 528/204; 528/196
[58] Field of Search ................................ 528/204, 196

[56] References Cited

U.S. PATENT DOCUMENTS 3,250,744 5/1966 Schnell et al. ...................... 528/204
4,543,313 9/1985 Mahabadi et al. .................. 430/109

FOREIGN PATENT DOCUMENTS 1264020 11/1986 Japan.
2227927 10/1987 Japan.

OTHER PUBLICATIONS

*European Polymer Journal*, vol. 15, Roviello et al., "Mesophasic Behaviour of Some Polycarbonates of 4,4'Dihydroxy-α,α'-Dimethylbenzalazine", (1979), pp. 423–430.

*Makromol. Chem.*, Rapid Commun., Sato et al., "New Liquid–Crystalline Polycarbonates from Diols Containing a Biphenyl Ring Sequence as Central Core", (1986), pp. 231–234.

*Primary Examiner*—Harold D. Anderson
*Attorney, Agent, or Firm*—William A. Teoli; James C. Davis, Jr.; William H. Pittman

[57] ABSTRACT

Polycarbonates are provided exhibiting anisotropic properties in the melt. Transesterification of diphenylcarbonate is effected in the melt with a mixture of methylhydroquinone and 4,4'-dihydroxybiphenyl. The polycarbonates are found to be insoluble in several common solvents such as chloroform, methylenechloride, and toluene.

3 Claims, No Drawings

ANISOTROPIC MELT-FORMING COPOLYCARBONATE FROM 4,4'-DIHYDROXY BIPHENYL AND METHYL HYDROQUINONE

BACKGROUND OF THE INVENTION

The present invention relates to a method for making polycarbonates exhibiting liquid crystalline properties. More particularly, the present invention relates to liquid crysytalline polycarbonates which are prepared by effecting in the melt, the transesterification of diphenylcarbonate with a mixture of methylhydroquinone and 4,4'-dihydroxybiphenyl.

Prior to the present invention, a number of liquid crystalline polyester-carbonates were reported, as shown by U.S. Pat. No. 4,107,143 and U.S. Pat. No. 4,371,660. Roviello et al., European Polymer Journal 15 (1979) pp. 423–430, reported the first liquid crystalline polycarbonates in 1978. These polycarbonates were prepared from 4,4'-dihydoxy-α,α'-dimethyl-benzalazine and various α,ω-alkanediol bischloroformates. Although these materials were found to be anisotropic under melt conditions, their melting points were less than 220° C. Additional liquid crystalline polycarbonates are shown by Mahabadi et al., U.S. Pat. No. 4,543,313; Sato et al., Makromol. Chem., Rapid Commun. 7 (1986) pp. 231–234. Japanese patent application No. 5.61-264020, uses a mixture of 70 mole % of 4,4'-dihydroxybiphenyl, and 30 mole % of bisphenol-A, and employs transesterification with diphenylcarbonate under melt conditions.

The present invention is based on the discovery that polycarbonate exhibiting liquid crystalline properties at temperatures exceeding 300° C., can be prepared in the melt by a transesterification reaction between diphenylcarbonate and mixtures of methylhydroquinone and 4,4'-dihydroxybiphenyl. The polycarbonates are found to be insoluble in common solvents, such as chloroform, methylene chloride, toluene, orthodichlorobenzene and 1,1,2,2-tetrachloroethane.

STATEMENT OF THE INVENTION

There is provided by the present invention, a polycarbonate capable of forming an anisotropic melt consisting essentially of bis(phenylenecarbonate) units of the formula,

 (1)

chemically combined with methylphenylene carbonate units of the formula,

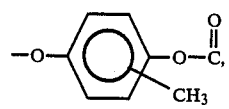 (2)

where there is present in the polycarbonate from about 25–60 mole % of the bis(phenylenecarbonate) units and about 75–40 mole % of the methylphenylenecarbonate units based on the total moles of intercondensed carbonate units of the polycarbonate.

There is also provided by the present invention, a method for making a polycarbonate capable of forming an anisotropic melt which comprises, effecting the removal of phenol from a molten mixture, while it is agitated, consisting essentially of 4,4'-dihydroxybiphenyl, methylhydroquinone, and diphenylcarbonate.

In the practice of the invention, a mixture of 4,4'-dihydroxybiphenyl, methylhydroquinone and diphenylcarbonate can be melted under an inert, nonoxidizing atmosphere such as a nitrogen atomosphere, at a temperature in the range of from about 300° C. to 360° C. The mixture can be agitated to effect the removal of phenol during the transesterification reaction. There can be utilized 50 to 55 mole % of diphenylcarbonate based on the total moles of 4,4'-dihydroxybiphenyl, methylhydroquinone and diphenylcarbonate. During the transesterification, a vacuum can be used in combination with agitation, such as achieved with the use of an extruder reactor, or stirrer to facilitate the removal of phenol.

In order that those skilled in the art will be better able to practice the present invention, the following examples are given by way of illustration and not by way of limitation. All parts are by weight.

EXAMPLE

A mixture of 3.80 grams (0.0298 mole) of methylhydroquinone, 2.36 grams (0.0127 mole) of 4,4'-dihydroxybiphenyl, and 10.0 grams (0.0468 mole) of diphenylcarbonate was melted under a nitrogen atmosphere while the mixture was stirred. A small amount of phenol was collected, and the temperature of the melt was raised to 320° C. over a period of one hour along with the use of a vacuum of approximately 1 torr which was applied for an additional hour while the mixture was stirred. During this period, the distillation rate of phenol increased to a maximum before decreasing and eventually stopping. The stirring of the mixture also became increasingly difficult as the viscosity of the reaction mixture increased. There was obtained a very fibrous semi-molten mass of polymeric product which quickly solidified upon cooling. Based on method of preparation, the product was a polycarbonate consisting essentially of biphenylcarbonate units intercondensed with methylhydroquinonecarbonate units. The material was isolated, ground into a fine powder, and analyzed by differential scanning calorimetry and polarized light microscopy.

Additional polycarbonate compositions were prepared following the same procedure to provide the following results:

TABLE

| Differential Scanning Calorimetry Data Summary | | |
|---|---|---|
| Methylhydroquinone/4,4'-Dihydroxybiphenyl | Tg (°C.) | Tm (°C.) |
| 40/60 | 104 | 424 |
| 50/50 | 105 | 408 |
| 60/40 | 126 | 340 |
| 70/30 | 99 | 295 |

When examined microscopically between crossed polarizers, the 70/30 polymer displayed a birefringent, anisotropic, liquid crystalline phase between 245° C. and 305° C. The 60/40 composition became birefringent when pressure was applied to a cover glass over a sample of the copolymer at temperatures above 300° C. In addition, the 50/50 copolymer and 40/60 copolymer developed areas of birefringency when the melt was held at 350° C. Based upon the above results, one skilled in the art would know that liquid crystalline polycarbonates are provided exhibiting valuable anisotropic properties, particularly when the copolymer contains about 60–70 mole % of methylhydroquinonecarbonate units and about 30–40 mole % of diphenylcarbonate units.

Although the above example is directed to only a few of the very many variables which can be used in making the liquid crystalline polycarbonate compositions of the present invention, it should be understood that the present invention is directed to a much broader variety of liquid crystalline polycarbonates as shown in the description preceding this example.

What is claimed and sought to be protected by Letters Patent of the U.S. is as follows:

1. A polycarbonate capable of forming an anisotropic melt consisting essentially of bis(phenylenecarbonate) units of the formula,

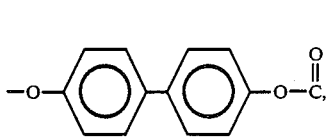

chemically combined with methylphenylene cabonate units of the formula,

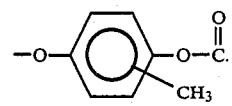

2. A polycarbonate in accordance with claim 1, having about 30 mole percent of bis(phenylenecarbonate) units, chemically combined with about 70 mole percent of methylphenylenecarbonate units.

3. A polycarbonate in accordance with claim 1, having about 40 mole percent of bis(phenylenecarbonate) units, chemically combined with about 60 mole percent of methylphenylenecarbonate units.

* * * * *